(12) United States Patent
Tsai (10) Patent No.: US 7,580,211 B2
(45) Date of Patent: Aug. 25, 2009

(54) DVD RECORDING

(75) Inventor: Chung-Hung Tsai, Chu-bei (TW)

(73) Assignee: MediaTek, Inc., Hsin-Chu (TW)

( * ) Notice: Subject to any disclaimer, the term of this patent is extended or adjusted under 35 U.S.C. 154(b) by 870 days.

(21) Appl. No.: 10/979,769

(22) Filed: Nov. 2, 2004

(65) Prior Publication Data

US 2006/0092772 A1    May 4, 2006

(51) Int. Cl.
    G11B 21/08    (2006.01)
(52) U.S. Cl. ......................... 360/48; 369/47.2
(58) Field of Classification Search ............ 360/48; 369/47.2, 59.26; 386/94, 116, 124, 125, 386/126
    See application file for complete search history.

(56) References Cited

U.S. PATENT DOCUMENTS

| | | | |
|---|---|---|---|
| 6,191,903 B1 * | 2/2001 | Fujimoto et al. ............ 360/48 |
| 6,330,214 B1 | 12/2001 | Ohta et al. | |
| 6,388,968 B1 | 5/2002 | Ohta et al. | |
| 7,149,171 B2 * | 12/2006 | Yamawaki ............... 369/59.25 |
| 2002/0044572 A1 * | 4/2002 | Nakajima ................. 370/537 |
| 2004/0005145 A1 * | 1/2004 | Chen ....................... 386/116 |
| 2005/0105895 A1 * | 5/2005 | Ju ............................ 386/96 |

* cited by examiner

Primary Examiner—Melvin Marcelo
(74) Attorney, Agent, or Firm—Fish & Richardson P.C.

(57) ABSTRACT

A DVD recorder including a multiplexer that stores multiplexed audio data and video data in a memory device, and a data scrambler that reads the multiplexed data from the memory device and scrambles the multiplexed data to generate scrambled data, in which the scrambled data has a bit sequence that is different from the multiplexed data. The data scrambler stores the scrambled data in the memory device. The multiplexer and the data scrambler access the memory device using a common memory controller.

45 Claims, 9 Drawing Sheets

| 136 → | | | | | | | | | | | |
|---|---|---|---|---|---|---|---|---|---|---|---|
| | B0,0 | B0,1 | ... | B0,170 | B0,171 | B0,172 | ... | B0,181 | | | |
| | B1,0 | B1,1 | ... | B1,170 | B1,171 | B1,172 | ... | B1,181 | | | |
| | B2,0 | B2,1 | ... | B2,170 | B2,171 | B2,172 | ... | B2,181 | | | |
| | ... | ... | . | ... | ... | ... | . | ... | | | |
| | B189,0 | B189,1 | ... | B189,170 | B189,171 | B189,172 | ... | B189,181 | | | |
| | B190,0 | B190,1 | ... | B190,170 | B190,171 | B190,172 | ... | B190,181 | | | |
| | B191,0 | B191,1 | ... | B191,170 | B191,171 | B191,172 | ... | B191,181 | | | |
| | B192,0 | B192,1 | ... | B192,170 | B192,171 | B192,172 | ... | B192,181 | | | |
| | ... | ... | . | ... | ... | ... | . | ... | | | |
| | B207,0 | B207,1 | ... | B207,170 | B207,171 | B207,172 | ... | B207,181 | | | |

← 172 COLUMNS → ← 10 COLUMNS → (134)

130 ↑, 132 ↓ (192 ROWS / 16 ROWS)

DVD RECORDING

BACKGROUND

This description relates to digital versatile disc (DVD) recording.

Figure 1:
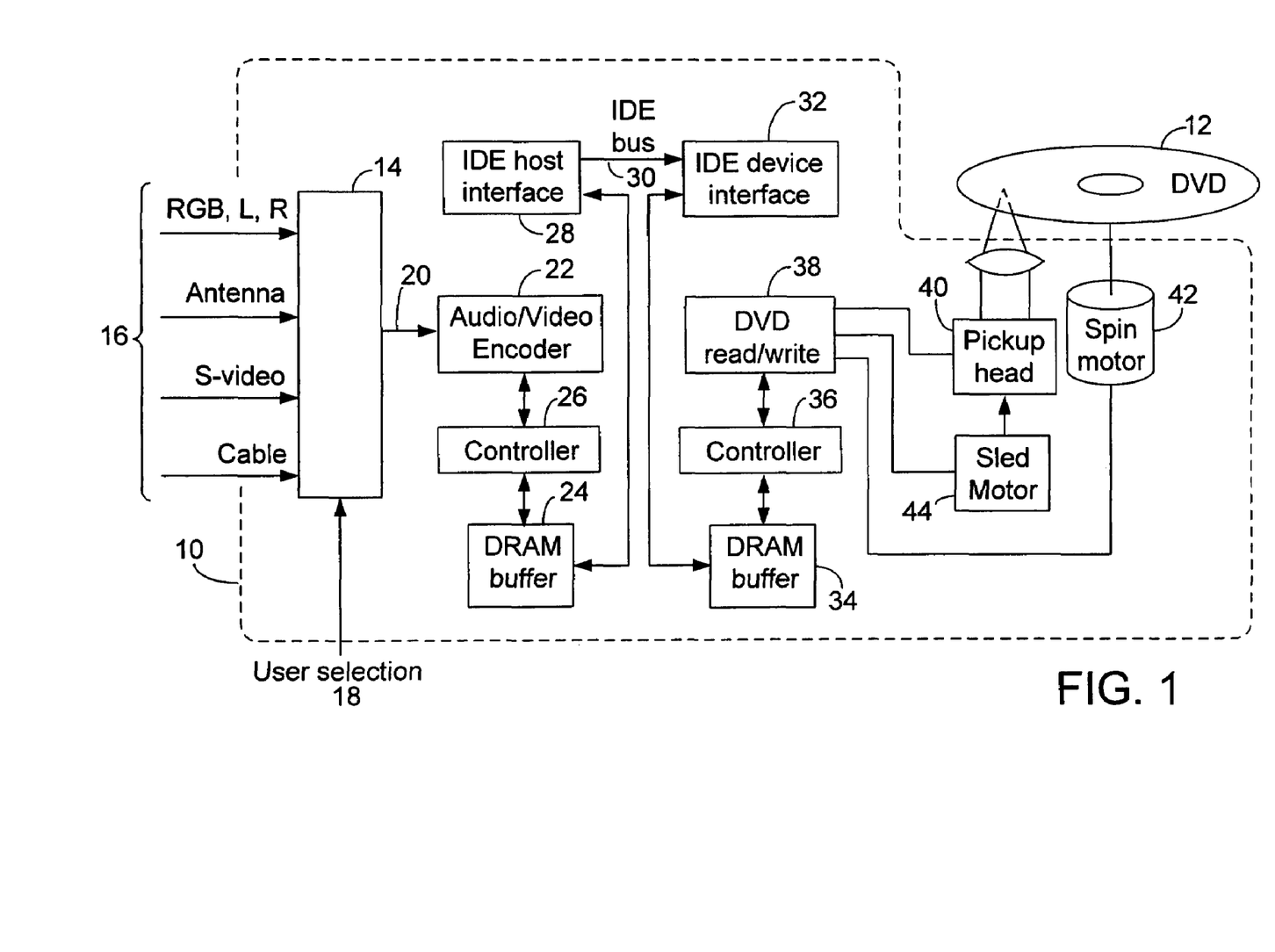
FIG. 1 shows a block diagram of a DVD recording system.

FIG. 1 shows a block diagram of a DVD recording system 10 for recording video and audio data to a DVD recordable or rewritable disc 12. A signal pre-processor 14 processes an audio/video signal 16 (e.g., one of red/green/blue video and left/right audio signals, an antenna signal, an S-video signal, and a cable signal) based on a user selection signal 18, and outputs a digitized audio/video bit stream 20. An audio/video encoder 22 encodes the audio/video bit stream 20 according to compression schemes, such as Dolby AC-3 standard for the audio portion of the bit stream 20 and Moving Picture Experts Group (MPEG) standard for the video portion of the bit stream 20, to generate encoded audio data and encoded video data, which are multiplexed to generate multiplexed audio/video data. The audio/video encoder 22 stores the multiplexed audio/video data in a dynamic random access memory (DRAM) buffer 24, access to which is controlled by a memory controller 26.

An IDE host interface 28 retrieves the multiplexed audio/video data from the DRAM buffer 24 through the memory controller 26, sends the data through an IDE bus 30 to an IDE device interface 32, which saves the multiplexed audio/video data into a DRAM buffer 34, access to which is controlled by a memory controller 36. A DVD read/write module 38 reads the multiplexed audio/video data from the DRAM buffer 34 through the controller 36, processes the multiplexed audio/video data to generate DVD channel encoded data, and stores the channel encoded data back to the DRAM buffer 34. The DVD read/write module 38 reads the channel encoded data from the DRAM buffer 34, and controls a pickup head 40 to write the data to the disc 12. The DVD read/write module 38 controls a spin motor 42 to adjust the rotation speed of the disc 12 and a sled motor 44 to control the position of the pickup head 40 relative to the disc 12 so that the DVD channel encoded data are written to specified locations on the disc 12.

SUMMARY

In one aspect, the invention features an apparatus that includes a multiplexer to store multiplexed audio data and video data in a memory device, and a data scrambler to read the multiplexed data from the memory device, scramble the multiplexed data to generate scrambled data, the scrambled data having a bit sequence that is different from the multiplexed data. The multiplexer and the data scrambler access the memory device using a common memory controller.

Implementations of the invention may include one or more of the following features. The apparatus includes an error correction code (ECC) encoder to generate error correction data based on the scrambled data, the error correction data allowing correction of one or more errors in the scrambled data. The apparatus includes a channel code generator to generate channel codes based on the error correction data and the scrambled data, the channel codes being compatible with an optical storage standard. The optical storage standard comprises at least one of DVD+RW, DVD−RW, DVD+R, DVD−R, and high density DVD (HD−DVD) standard. The error correction data are compatible with DVD standard. The scrambled data are compatible with DVD standard.

The apparatus includes an integrated circuit that includes the multiplexer and the data scrambler. The apparatus includes an audio/video processor to process an audio signal and a video signal according to a compression process to generate the audio data and the video data. A portion of the compression process for processing the video data is compatible with a Moving Picture Experts Group (MPEG) standard. The MPEG standard includes at least one of MPEG 2 and MPEG 4 standard. The apparatus includes an integrated circuit that includes the multiplexer, the data scrambler, and the audio/video processor.

The multiplexed data are not transferred to the data scrambler through an integrated device electronics (IDE) interface. The apparatus includes an identification error detection (IED) encoder that generates an error detection code for an identification code associated with each sector of the multiplexed data. The apparatus includes an error detection code (EDC) encoder that generates error detection data for each sector of the multiplexed data, the EDC allowing detection of one or more errors in a sector of the multiplexed data.

The apparatus includes an error correction code (ECC) encoder to generate error correction data for a predetermined number of sectors of the multiplexed data, the error correction data allowing correction of one or more errors in the predetermined number of sectors of the multiplexed data. The ECC encoder generates the error correction data based on the multiplexed data and their associated identification code and error detection data, the error correction data allowing correction of one or more errors in the multiplexed data and their associated identification data and error detection data. The data scrambler and the IED encoder scrambles the multiplexed data and generates the error detection code without storing information in the memory device.

In another aspect, the invention features a digital versatile disc (DVD) recorder that includes an audio/video encoder and a DVD encoder. The audio/video encoder encodes audio data according to an audio compression standard and encodes video data according to an MPEG standard to generate encoded audio data and encoded video data, multiplexes the encoded audio data and encoded video data to generate multiplexed data, and saves the multiplexed data to a memory device. The DVD encoder reads the multiplexed data from the memory device, scrambles the multiplexed data to generate scrambled data, generates error detection code to allow detection of an error in the scrambled data, and saves the scrambled data, the error detection code to the memory device. The DVD encoder also reads the scrambled data and the error detection code from the memory device, generates error correction code based on the scrambled data and the error detection code, and saves the error correction code, the error detection code, and the scrambled data in the memory device. The audio/video encoder and the DVD encoder access the memory device by using a common memory controller.

Implementations of the invention may include one or more of the following features. The DVD write module generates channel codes based on the error correction code, the error detection code, and the scrambled data according to DVD standard. The DVD recorder includes an integrated circuit that includes the audio/video encoder and the DVD encoder. The DVD encoder includes an identification error detection encoder that generates an error detection code for an identification code associated with each sector of the multiplexed data.

In another aspect, the invention features an apparatus that includes a memory having a first region and a second region, a multiplexer to store multiplexed audio data and video data in the first region of the memory, and an encoder. The encoder reads the multiplexed data from the first region of the memory, processes the multiplexed data to generate code that includes error correction information and having a format that is compatible with a recording standard for recording the code to an optical storage medium, and stores the code in the second region of the memory. The encoder reads the multiplexed data from the first region and stores the code in the second region of the memory without using an integrated drive electronics (IDE) interface.

Implementations of the invention may include one or more of the following features. The encoder includes a data scrambler to scramble the multiplexed data to generate scrambled data. The encoder includes an error detection code (EDC) encoder to generate error detection data based on the scrambled data to allow detection of one or more errors in the scrambled data, the EDC encoder storing the error detection data and the scrambled data in a third region of the memory. The storage data processing unit includes an error correction code encoder to read the scrambled data and the error detection data from the third region of the memory, and process the scrambled data and the error detection data to generate the code that includes error correction information. The optical storage medium is compatible with DVD standard.

In another aspect, the invention features an apparatus that includes first data processing means for storing multiplexed audio data and video data in a memory device, and second data processing means for reading the multiplexed data from the memory device, scrambling the multiplexed data to generate scrambled data, and storing the scrambled data in the memory device. The first and second data processing means access the memory device using a common memory controller.

Implementations of the invention may include one or more of the following features. The second data processing means access the memory device not more than twice for each sector of multiplexed data that is scrambled, the first access to the memory to read a sector of the multiplexed data from the memory, and the second access to the memory to write the scrambled data to the memory device. The apparatus includes a third data processing means for generating error correction codes based on the scrambled data. The apparatus includes a fourth data processing means for generating channel codes based on the error correction codes and the scrambled data, the channel codes being compatible with an optical storage standard. The optical storage standard includes DVD standard.

In another aspect, the invention features a method that includes storing multiplexed audio data and video data in a memory device, scrambling the multiplexed data to generate scrambled data, the scrambled data having a bit sequence that is different from the multiplexed data, and storing the scrambled data in the memory device. Storing the multiplexed data to the memory and storing the scrambled data to the memory are performed using a common memory controller.

Implementations of the invention may include one or more of the following features. The method includes generating error correction data based on the scrambled data, the error correction data allowing correction of one or more errors in the scrambled data. The method includes generating channel codes based on the error correction data and the scrambled data, the channel codes being compatible with an optical storage standard. The optical storage standard includes at least one of DVD+RW, DVD-RW, DVD+R, DVD-R, and high density DVD (HD-DVD) standard. The error correction data are compatible with DVD standard. The scrambled data are compatible with DVD standard. The method includes processing an audio signal and a video signal according to compression processes to generate the audio data and the video data. The compression process for processing the video signal is compatible with MPEG standard. The MPEG standard includes at least one of MPEG 2 and MPEG 4 standard.

Scrambling the multiplexed data includes reading the multiplexed data from the memory device, the reading performed without using an integrated device electronics (IDE) interface. The method includes generating identification data for each sector of the multiplexed data. The method includes generating error detection data for each sector of the multiplexed data, the error detection data allowing detection of one or more errors in the multiplexed data. The method includes generating error correction data for a predetermined number of sectors of the multiplexed data and their associated identification data and error detection data, the error correction data allowing correction of one or more errors in the predetermined number of sectors of the multiplexed data and their associated identification data and error detection data. Generating the identification data and scrambling the multiplexed data are performed without storing information to the memory device.

Other features and advantages of the invention will be apparent from the description and drawings, and from the claims.

DESCRIPTION

Figure 2:
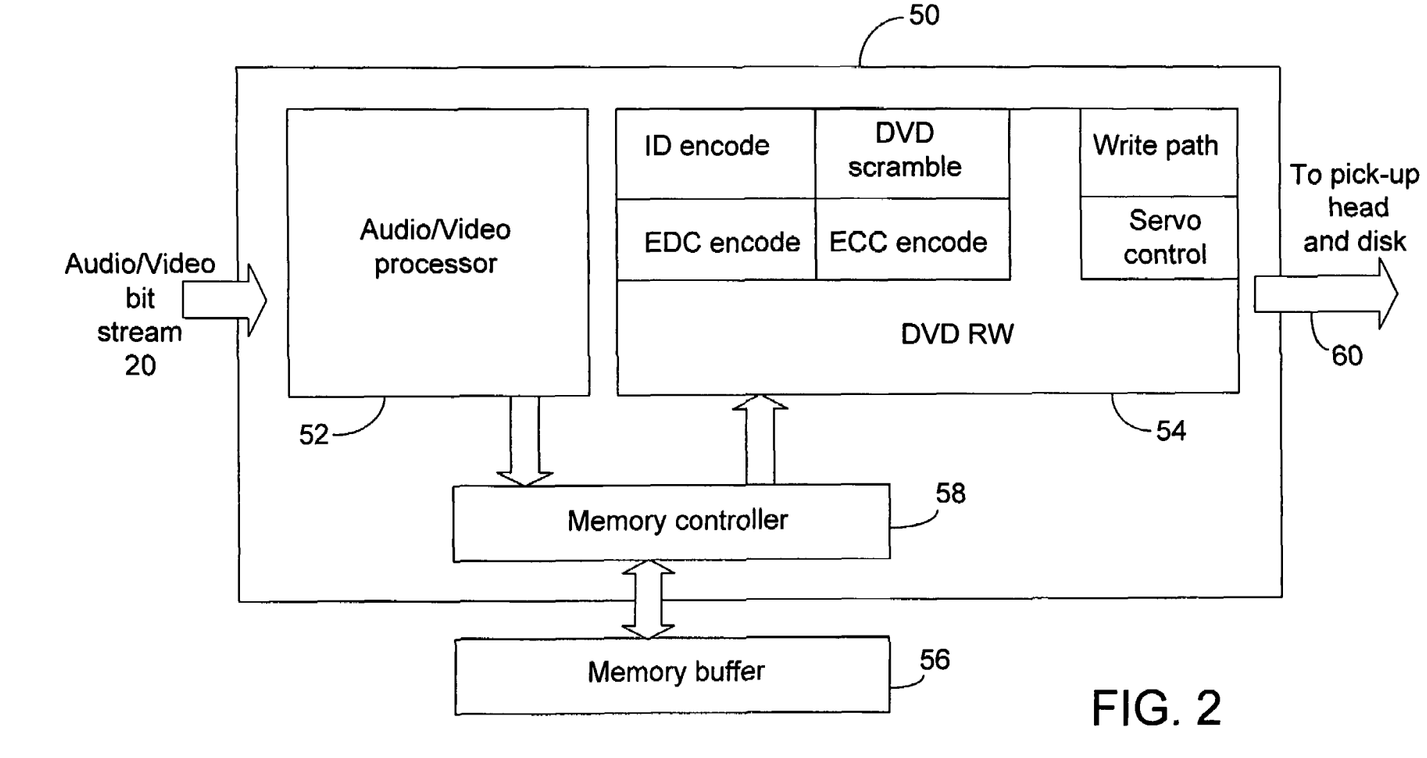
FIGS. 2 and 3 each shows a block diagram of an integrated DVD controller chip and a memory buffer.

FIG. 2 shows a block diagram of an integrated DVD controller chip 50 that can be used in a DVD recording system 10 to process audio and video data to generate DVD channel encoded data suitable for writing to a DVD recordable or rewriteable disc 12. The DVD controller chip 50 includes an audio/video processor 52 and a DVD read/write module 54 that access a single memory buffer 56 through a single memory controller 58. The audio/video processor 52 processes an audio/video bit stream 20 to generate multiplexed audio/video data, and stores the data in the memory buffer 56. The DVD read/write module 54 accesses the multiplexed audio/video data directly through the memory controller 58 without using IDE host/device interfaces (such as 28 and 32 in FIG. 1). This reduces the number of components in the DVD controller chip 50, reduces the cost of the chip 50, and increases the processing speed of the audio/video data. The DVD read/write module 54 generates DVD channel encoded data based on the multiplexed audio/video data, and writes the DVD channel encoded data to the DVD disc 12 through an output path 60.

Figure 3:
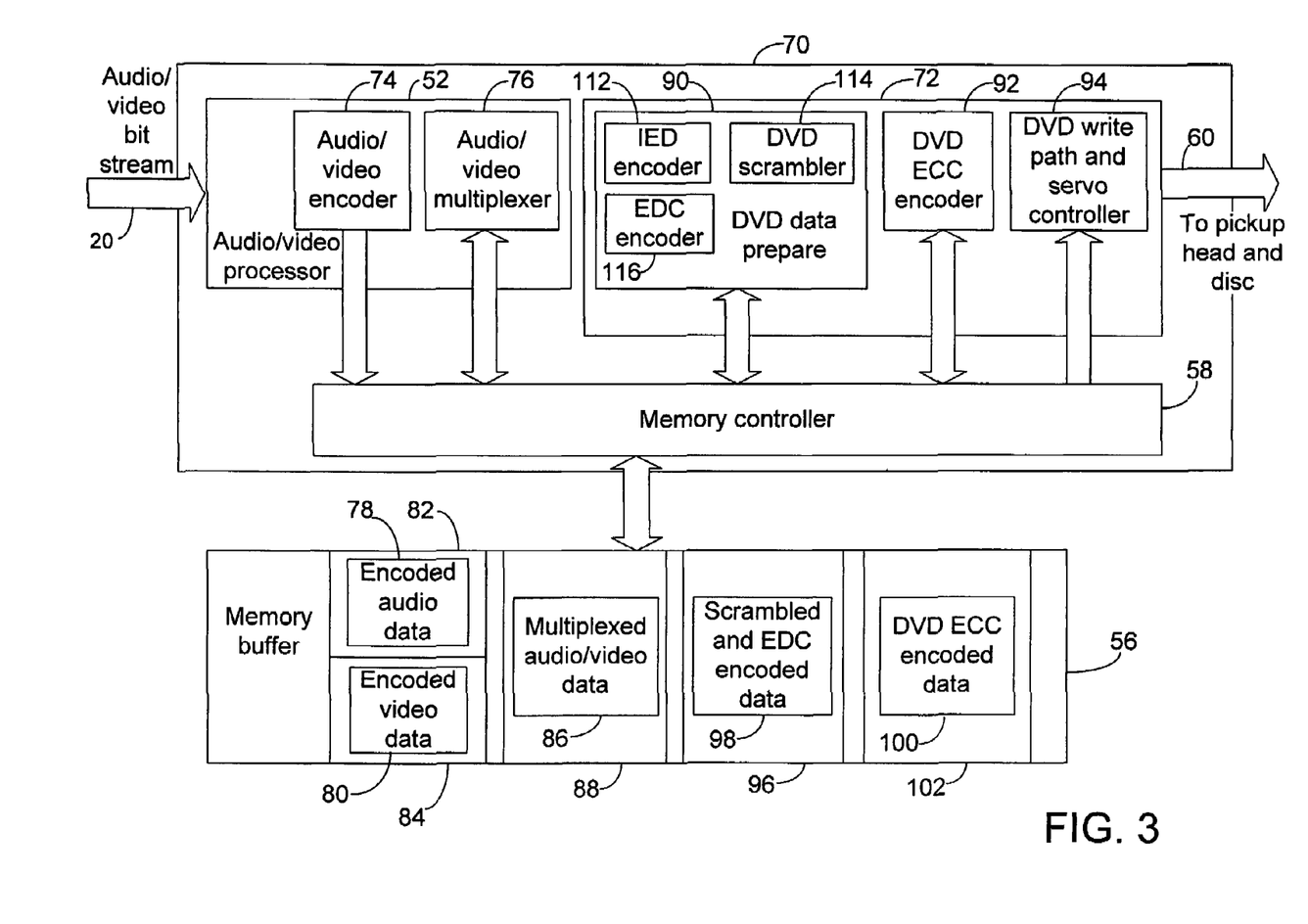

FIG. 3 shows a block diagram of an example of a DVD controller chip 70 and the memory buffer 56. The DVD controller chip 70 includes an audio/video processor 52 and a DVD read/write module 72. The audio/video processor 52 includes an audio/video encoder 74 and an audio/video multiplexer 76. The audio/video encoder 74 encodes the audio portion of the audio/video bit stream 20 according to the AC-3 standard and the video portion of the A/V bit stream 20 according to the MPEG standard (e.g., MPEG-2 or MPEG-4) to generate encoded audio data 78 and encoded video data 80. The audio/video encoder 74 stores the data 78 and 80 to memory regions 82 and 84, respectively, of the memory buffer 56.

The audio/video multiplexer 76 reads the encoded audio data 78 and the encoded video data 80 from the memory regions 82 and 84, respectively, multiplexes the data 78 and 80, and adds navigation data (e.g., information used to create on-screen menus) to generate multiplexed audio/video data 86. The audio/video multiplexer 76 stores the multiplexed audio/video data 86 in a memory region 88.

The DVD read/write module 72 includes a DVD data prepare module 90, a DVD error correction code (ECC) encoder 92, and a DVD write path and servo controller 94. In one example, each module processes units of the multiplexed audio/video data 72 in a sequence according to DVD standard (established by DVD Forum), to generate data that has a format suitable for recording to the disc 12. There are different types of DVD recordable or rewritable discs, e.g., DVD–R, DVD+R, DVD–RW, DVD+RW, and high density DVD (HD–DVD). When the disc 12 is inserted into the DVD recording system 10, the system 10 detects the type of the disc 12. The DVD read/write module 72 processes the multiplexed audio/video data 72 according to the particular type of disc 12 in the recording system 10.

In one example, each of the DVD data prepare module 90, DVD ECC encoder 92, and DVD write path and servo controller 94 processes a sector or a group of sectors in sequence, each sector including 2048 bytes of multiplexed audio/video data 86. Depending on the stage of signal processing, the phrase "a sector of data" may refer to 2048 bytes of multiplexed audio/video data 86, or 2048 bytes of multiplexed audio/video data 86 and associated information, such as header and error correction information.

The DVD data prepare module 90 is configured so that, for each sector (2048 bytes) of the multiplexed audio/video data 86 processed by the module 90, the module 90 reads from the memory region 88 once and writes to a memory region 96 once. This has the advantage of reducing the number of accesses to the memory buffer 56, allowing more memory bandwidth to be allocated for other modules (e.g., audio/video encoder 74, audio/video multiplexer 76, DVD ECC encoder 92, and DVD write path and servo controller 94). This increases the overall performance of the chip 70 in processing audio and video data. As described below, the DVD data prepare module 90 processes the multiplexed audio/video data 86 to generate scrambled and EDC encoded data 98, which is stored in the memory region 96 of the memory buffer 56. The DVD ECC encoder 92 reads the scrambled and EDC encoded data 98 from the memory region 96 and generates DVD ECC encoded data 100, which is stored in a memory region 102 of the memory buffer 56. The DVD servo and write path controller 94 reads the DVD ECC encoded data 100 from the memory region 102, and writes the data to the DVD disc 12 through an output path 60.

Figure 4:
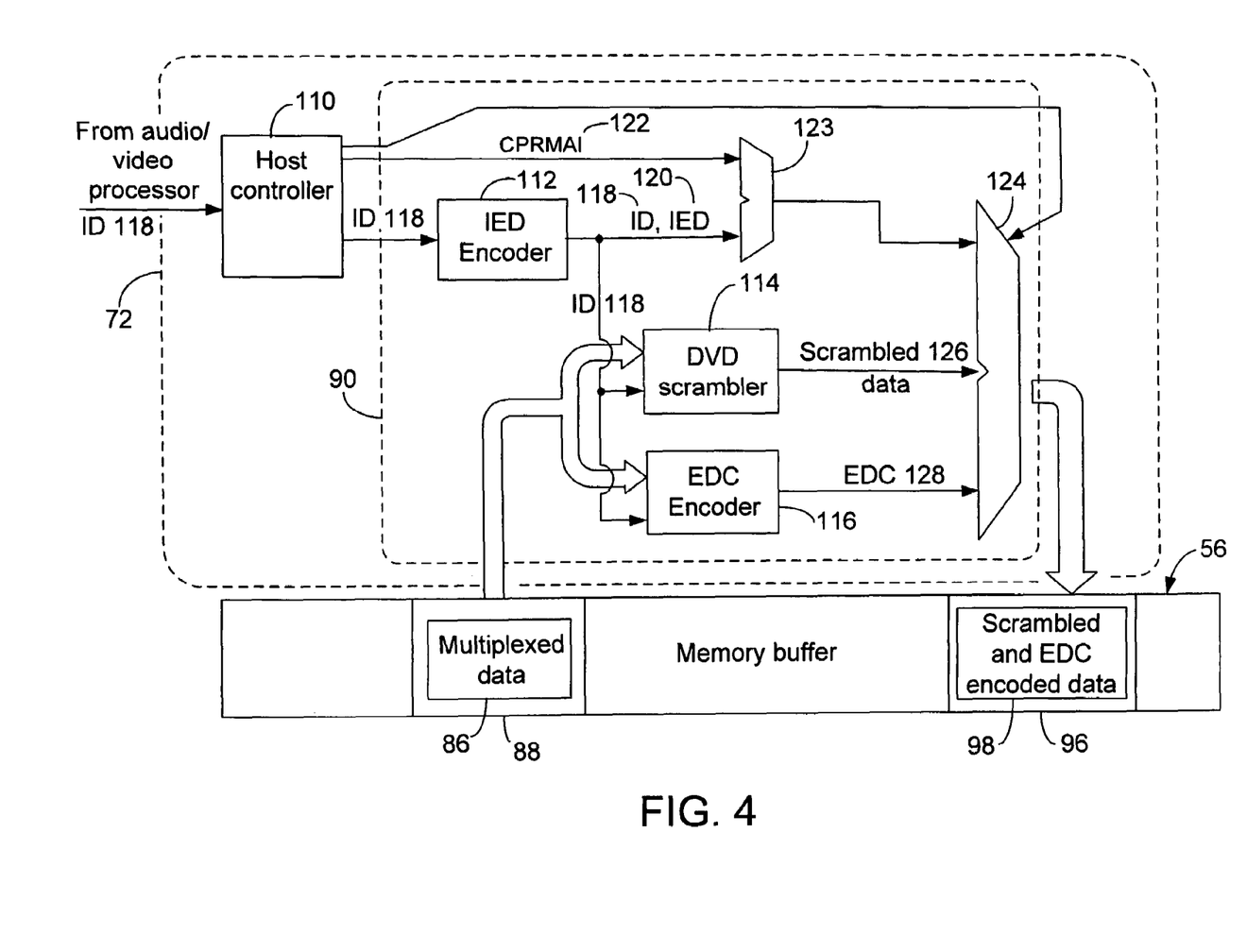
FIG. 4 shows a block diagram of a DVD data prepare module and the memory buffer.

Referring to FIG. 4, the DVD read/write module 72 includes a host controller 110 that performs software related operations. The DVD data prepare module 90 includes an identification error detection (IED) encoder 112, a DVD scrambler 114, and an error detection code (EDC) encoder 116. The host controller 110 receives a 4-byte ID code 118 from the audio/video processor 52 and forwards the ID code 118 to the IED encoder 112, which generates a 2-byte ID error detection (IED) code 120 that is used to detect one or more errors in the ID code 118. The IED encoder 112 outputs the ID code 118 and the IED code 120 to a multiplexer 123, which also receives 6 bytes of copyright and region management information (CPRMAI) 122 from the host controller 110. The output of the multiplexer 123 is sent to a multiplexer 124.

In one example, the ID code 118 includes 1 byte of sector information and a 3-byte sector number. The sector information includes information on sector format type, tracking method, reflectivity, area type, data type, and layer number. The IED code 120 allows detection of one or more errors in the sector information and the sector number. The IED encoder 112 also sends the ID code 118 to the DVD scrambler 114 and the EDC encoder 116.

The data prepare module 90 reads 2048 bytes of the multiplexed audio/video data 86 from the memory buffer 56, which are forwarded to the DVD scrambler 114 and the EDC encoder 116. The DVD scrambler 114 scrambles the multiplexed audio/video data 86 to generate 2048 bytes of scrambled data 126, represented by D0 to D2047 (see FIG. 5). The DVD scrambler 114 sends the scrambled data 126 to the multiplexer 124.

The EDC encoder 116 generates a 4-byte error detection code 128 based on the 2048 bytes of the multiplexed audio/video data 86, and sends the error detection code 128 to the multiplexer 124. The error detection code 128 provides error detection capability at the sector level.

The host controller 110 controls the multiplexer 124 to selectively send the ID code 118, the IED code 120, the copyright and region management information 122, the scrambled data 126, and the error detection code 128 in a particular sequence to a memory region 96 of the memory buffer 56 to generate the scrambled and EDC encoded data 98.

Figure 5:
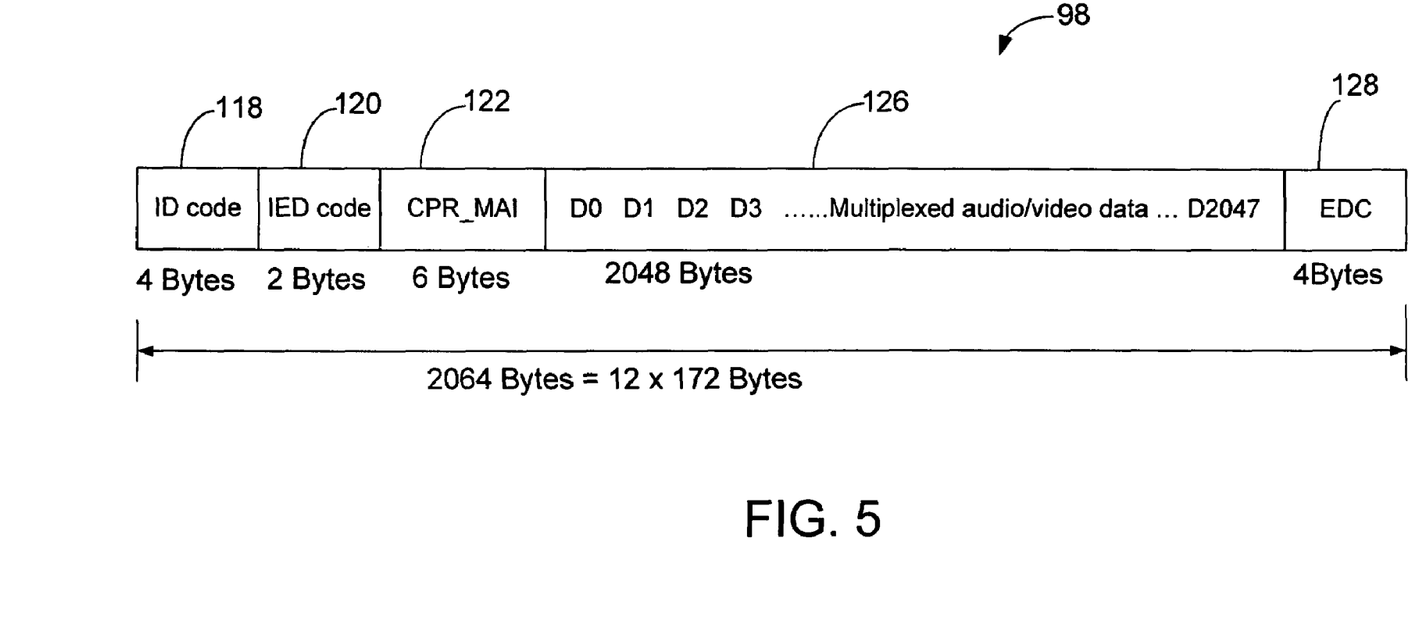
FIG. 5 shows a sector of scrambled and EDC encoded data.

FIG. 5 shows an example of a sector of the scrambled and EDC encoded data 98, which has 2064 bytes, including 4 bytes of ID code 118, 2 bytes of ID error detection code 120, 6 bytes of copyright and region management information 122, 2048 bytes of scrambled data 126, and 4 bytes of error detection code 128.

Figure 6A:
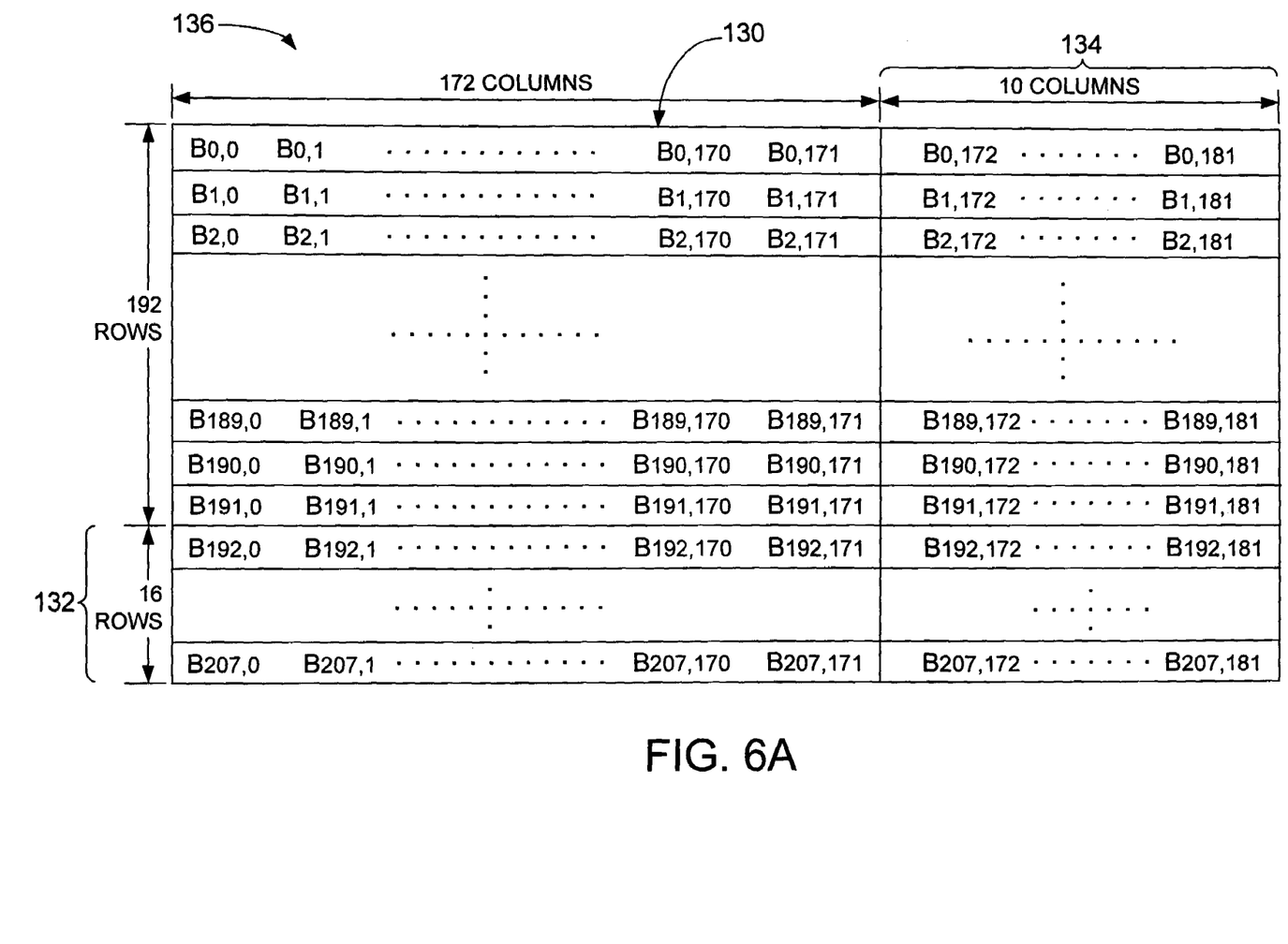
FIG. 6A shows an ECC block.
Figure 6B:
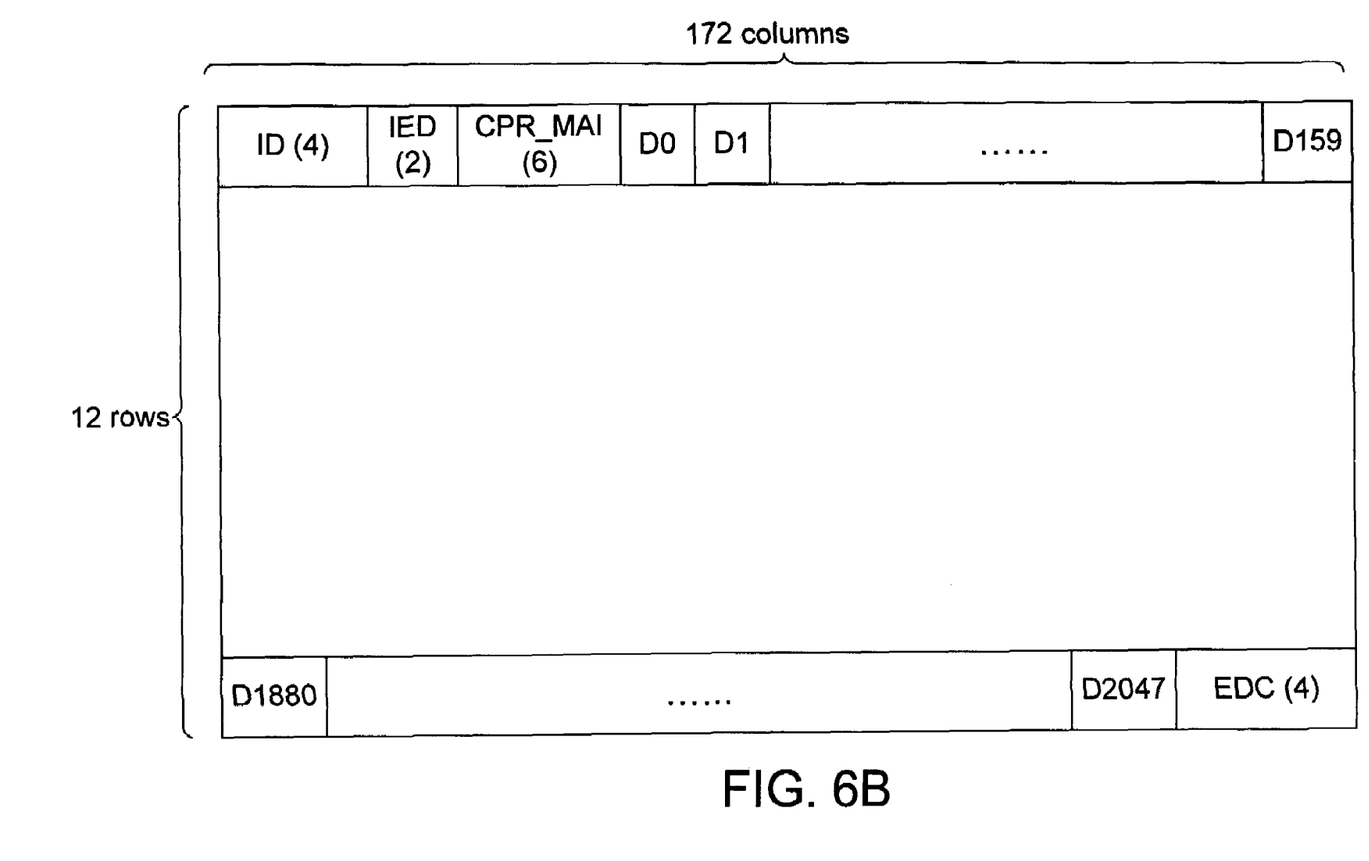
FIG. 6B shows a sector of scrambled and EDC encoded data.

Referring to FIG. 6A, the DVD ECC encoder 92 (FIG. 3) reads 16 sectors (16×2064 bytes) of the scrambled and EDC encoded data 98 from the memory region 96, and arranges the 16 sectors of the data 98 in a matrix 130 of 192 rows by 172 columns, representing 192×172 bytes of data. The first sector occupies rows 1 to 12 of the matrix 130, the second sector occupies rows 13 to 24 of the matrix 130, and so forth. Each sector of the scrambled and EDC encoded data 98 is arranged in 12 rows by 172 columns, as shown in FIG. 6B.

The DVD ECC encoder 92 encodes the EDC encoded data 98 using a Reed-Solomon product code scheme. Sixteen outer code (PO) parity bytes 132 are added to each column of the matrix 130, and ten inner code (PI) parity bytes 134 are added to each of the resulting 208 rows to form a Reed-Solomon product code having 208 rows and 182 columns. The 208 rows include 192 rows of data and 16 rows of outer code parity bytes, and the 182 columns include 172 columns of data and 10 columns of inner code parity bytes. The Reed-Solomon product code includes error correction information that can correct at least 5 byte errors in each row and at least 8 byte errors in each column. Each 208 row by 182 column of Reed-Solomon product code is referred to as an ECC block 136. The DVD ECC encoder 92 saves the ECC encoded data 100, which includes one or more ECC blocks 136, in the memory region 102.

The DVD write path and servo controller 94 (FIG. 3) reads a block of ECC encoded data 100 (including 208 rows and 182 columns) from the memory region 102, and processes the ECC encoded data 100 according to the DVD standard. The DVD write path and servo controller 94 interleaves rows of outer code parity bytes 132 with the rows of data 98 (1 parity row following 12 data rows) to generate interleaved ECC blocks. Each interleaved ECC block is divided into 16 recording sectors, which are converted into physical sectors. The physical sectors are converted into channel codes using eight-to-sixteen modulation (also referred to as eight-to-fourteen modulation plus, or EFM+), which converts 8 data bits of data into 16 channel bits of channel code. The DVD write path and servo controller 94 controls a pickup head 40 to write the channel codes to the disc 12.

In the example of FIG. 3, the memory buffer 56 is divided into several memory regions that store different types of data. Each of the audio/video encoder 74, the audio/video multiplexer 76, the DVD data prepare module 90, and the DVD ECC encoder 92 stores data in a different region of the memory buffer 56, and each of the audio/video encoder 74, the audio/video multiplexer 76, the DVD data prepare module 90, the DVD ECC encoder 92, and the DVD write path and servo controller 94 accesses the memory buffer 56 independently using the memory controller 58.

Figure 7:
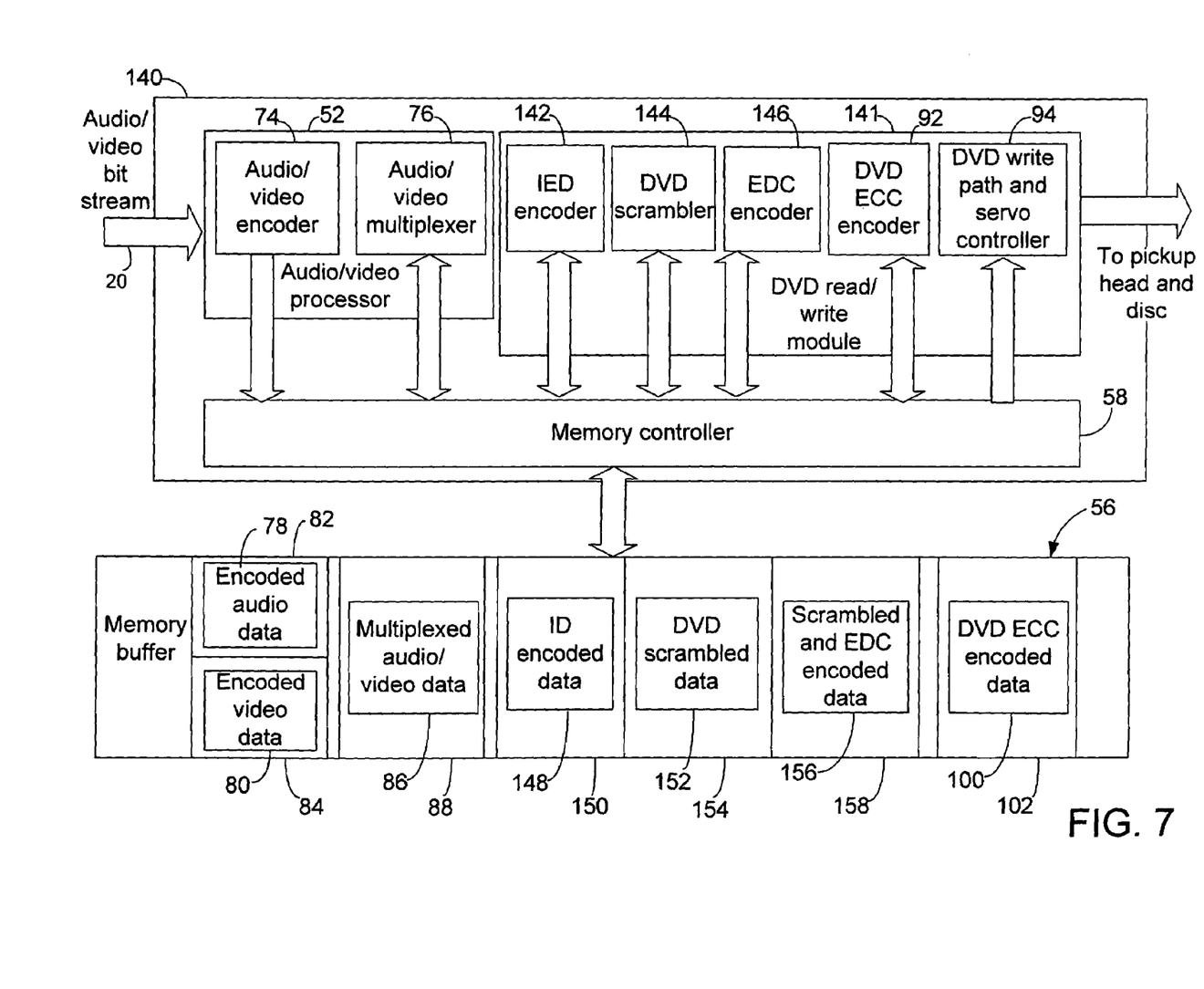
FIGS. 7 and 8 each shows a block diagram of an integrated DVD controller chip and a memory buffer.

FIG. 7 shows a block diagram of an example of a DVD controller chip 140 in which a DVD read/write module 141 includes an IED encoder 142, a DVD scrambler 144, an EDC encoder 146, an ECC encoder 92, and a DVD write path and servo controller 94 that process units of the multiplexed audio/video data 86 in sequence. In one example, each of the IED encoder 142, the DVD scrambler 144, the EDC encoder 146, and the DVD ECC encoder 92 processes a sector or a group of sectors in sequence, each sector including 2048 bytes of multiplexed audio/video data 86. The ECC encoder 92 and the DVD write path and servo controller 94 in FIG. 7 operate similarly to the ECC encoder and DVD write path and servo controller shown in FIG. 3.

The IED encoder 142 reads a sector (2048 bytes) of the multiplexed audio/video data 86 from the memory region 88, and adds 12 bytes of identification data (including 4 bytes of ID code 118, 2 bytes of ID error detection code 120, and 6 bytes of copyright and region management information 122) to generate ID encoded data 148 (which has 2060 bytes). The IED encoder 142 stores the ID encoded data 148 in a memory region 150.

The DVD scrambler 144 reads a sector of the ID encoded data 148 (including 12 bytes of identification data and 2048 bytes of multiplexed audio/video data 86) from the memory region 150, and scrambles the 2048 bytes of multiplexed audio/video data 86. The scrambler 144 combines the identification data and the scrambled and multiplexed audio/video data 86 to generate scrambled data 152 (including 2060 bytes), and stores the scrambled data 152 in a memory region 154.

The EDC encoder 146 reads a sector of the scrambled data 152 (including 2060 bytes) from the memory region 154, and adds 4 bytes of error detection code to the scrambled data 152 to generate EDC encoded data 156 (which includes 2064 bytes). The EDC encoded data 156 are stored into a memory region 158.

In the example of FIG. 7, the memory buffer 56 is divided into several memory regions that store different types of data. Each of the audio/video encoder 74, audio/video multiplexer 76, IED encoder 142, DVD scrambler 144, EDC encoder 146, and DVD ECC encoder 92 stores data in a different region of the memory buffer 56, and each of the audio/video encoder 74, audio/video multiplexer 76, IED encoder 142, DVD scrambler 144, EDC encoder 146, DVD ECC encoder 92, and DVD write path and servo controller 94 accesses the memory buffer 56 independently using the memory controller 58.

Comparing the DVD controller chip 140 with the controller chip 70 (FIGS. 3 and 4), a feature of the controller chip 140 is that each of the IED encoder 142, DVD scrambler 144, and EDC encoder 146 accesses the memory buffer 56 independently and processes the multiplexed audio/video data 86 in units of different sizes. An advantage of the controller chip 70 is that the chip 70 accesses the memory buffer 56 less frequently. In the example of FIG. 3, the outputs of the IED encoder 112 and the DVD scrambler 114 are not stored into the memory buffer 56, allowing more memory bandwidth to be allocated for other modules (e.g., audio/video encoder 74, audio/video multiplexer 76, DVD ECC encoder 92, and DVD write path and servo controller 94). This increases the speed of processing the audio and video data.

Figure 8:
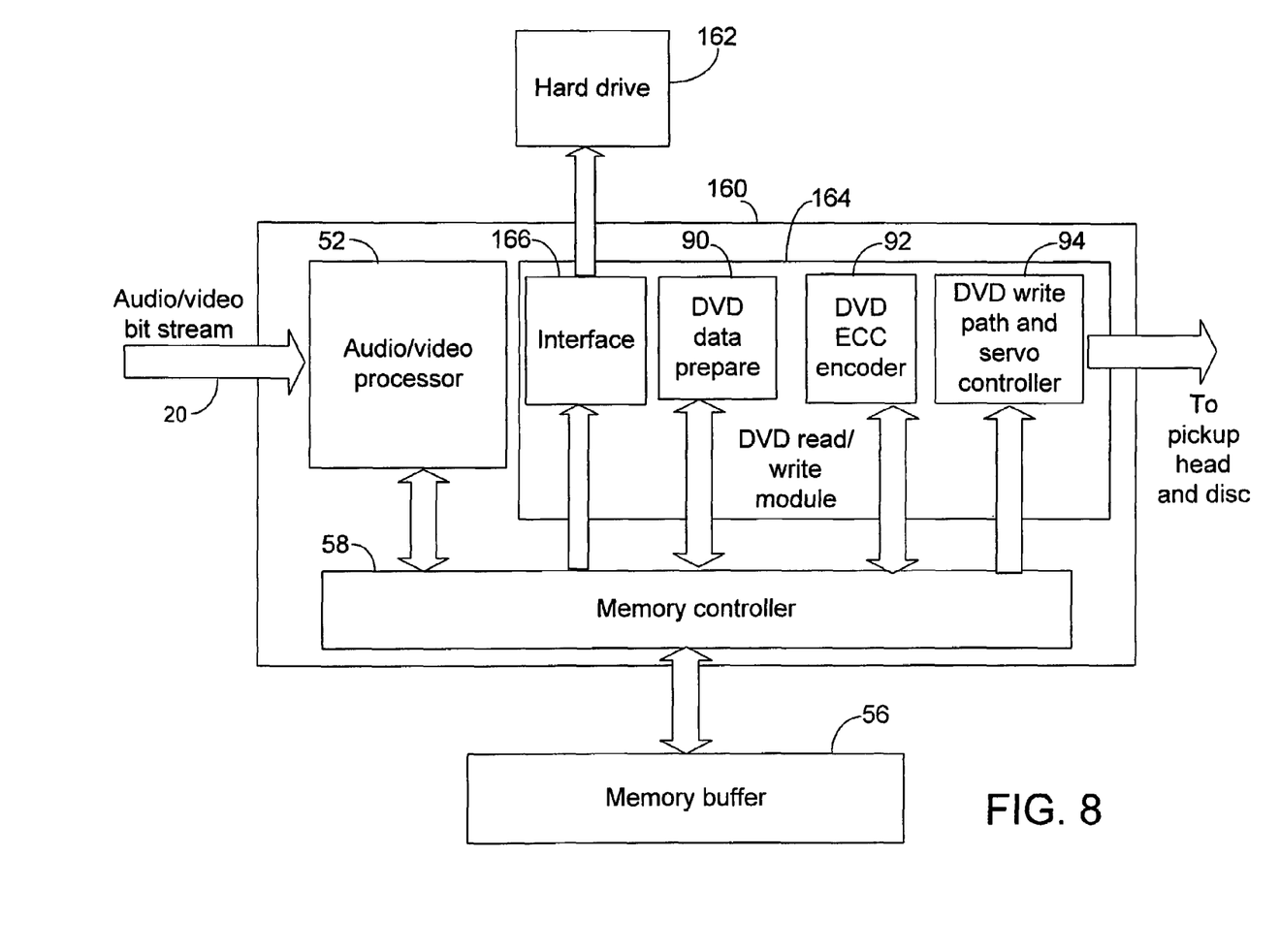

FIG. 8 shows a block diagram of an example of a DVD controller chip 160 that allows a user to determine whether to store the multiplexed audio/video data 86 to a hard disk drive 162 or a DVD optical disc 12. The controller chip 160 has a DVD read/write module 164 that includes an interface 166 (e.g., an IDE interface) to allow the multiplexed audio/video data 86 to be stored to the hard disk drive 162. When the multiplexed audio/video data 86 are stored to the hard disk drive 162, the data 86 are not processed by the DVD data prepare module 90 nor the ECC encoder 92.

Although some examples have been discussed above, other implementation and applications are also within the scope of the following claims. For example, the DVD controller chips 50, 70, 140, and 160 may include modules for processing data read from the disc 12. The modules may convert the channel codes read from the disc 12 according to the DVD standard to generate multiplexed audio/video data, and decode the multiplexed audio/video data to generate audio data and video data according to the MPEG standard. The audio data and the video data can be processed and sent to external multimedia devices (e.g., speakers, video displays, or projectors) in an analog or digital format.

The format of the ID code 118, the IED code 120, the copyright and region management information 122, the scrambled data 126, and the EDC code 128 can be different from what has been described. The DVD data prepare module 90, the ECC encoder 92, and the DVD write path and servo controller 94 can process data in units having sizes different from what has been described. The audio/video encoder 74 can encode the audio data and the video data using encoding schemes that are different from the AC-3 and MPEG standards. The disc 12 may comply with a standard that is different from the DVD standard, and the DVD read/write modules 54, 72, and 141 may be configured to process the multiplexed audio/video data 86 according to a standard that is different from the DVD standard.

The audio/video processor 52, the DVD read/write module 54, and the memory controller 58 may be integrated in a single integrated circuit, or be separated in different integrated circuits. The memory buffer 56 may include a single integrated circuit of memory cells, or include several integrated circuits under the control of the memory controller 58.

What is claimed is:

1. An apparatus comprising:
   a multiplexer to store multiplexed audio data and video data in a memory device; and
   a data scrambler to read the multiplexed data from the memory device, scramble the multiplexed data to generate scrambled data and store the scrambled data in the memory device, the scrambled data having a bit sequence that is different from the multiplexed data, in which the multiplexer and the data scrambler access the memory device using a common memory controller.

2. The apparatus of claim 1, further comprising an error correction code (ECC) encoder to generate error correction data based on the scrambled data, the error correction data allowing correction of one or more errors in the scrambled data.

3. The apparatus of claim 2, further comprising a channel code generator to generate channel codes based on the error correction data and the scrambled data, the channel codes being compatible with an optical storage standard.

4. The apparatus of claim 3 in which the optical storage standard comprises at least one of DVD+RW, DVD−RW, DVD+R, DVD−R, and high density DVD (HD−DVD) standard.

5. The apparatus of claim 2 in which the error correction data are compatible with DVD standard.

6. The apparatus of claim 1 in which the scrambled data are compatible with DVD standard.

7. The apparatus of claim 1 in which the apparatus comprises an integrated circuit that comprises the multiplexer and the data scrambler.

8. The apparatus of claim 1, further comprising an audio/video processor to process an audio signal and a video signal according to a compression process to generate the audio data and the video data.

9. The apparatus of claim 8 in which a portion of the compression process for processing the video data is compatible with a Moving Picture Experts Group (MPEG) standard.

10. The apparatus of claim 9 in which the MPEG standard comprises at least one of MPEG 2 and MPEG 4 standard.

11. The apparatus of claim 8 in which the apparatus comprises an integrated circuit that comprises the multiplexer, the data scrambler, and the audio/video processor.

12. The apparatus of claim 1 in which the multiplexed data are not transferred to the data scrambler through an integrated device electronics (IDE) interface.

13. The apparatus of claim 1, further comprising an identification error detection (IED) encoder that generates an error detection code for an identification code associated with each sector of the multiplexed data.

14. The apparatus of claim 13, further comprising an error detection code (EDC) encoder that generates error detection data for each sector of the multiplexed data, the EDC allowing detection of one or more errors in a sector of the multiplexed data.

15. The apparatus of claim 14, further comprising an error correction code (ECC) encoder to generate error correction data for a predetermined number of sectors of the multiplexed data, the error correction data allowing correction of one or more errors in the predetermined number of sectors of the multiplexed data.

16. The apparatus of claim 15 in which the ECC encoder generates the error correction data based on the multiplexed data and their associated identification code and error detection data, the error correction data allowing correction of one or more errors in the multiplexed data and their associated identification data and error detection data.

17. The apparatus of claim 14 in which the data scrambler and the IED encoder scrambles the multiplexed data and generates the error detection code without storing information in the memory device.

18. A digital versatile disc (DVD) recorder comprising:
an audio/video encoder to encode audio data according to an audio compression standard and encode video data according to an MPEG standard to generate encoded audio data and encoded video data, multiplex the encoded audio data and encoded video data to generate multiplexed data, and save the multiplexed data to a memory device;
a DVD encoder to read the multiplexed data from the memory device, scramble the multiplexed data to generate scrambled data, generate error detection code to allow detection of an error in the scrambled data, and save the scrambled data and the error detection code to the memory device,
the DVD encoder to also read the scrambled data and the error detection code from the memory device, generate error correction code based on the scrambled data and the error detection code, and save the error correction code, the error detection code, and the scrambled data in the memory device,
in which the audio/video encoder and the DVD encoder access the memory device using a common memory controller.

19. The DVD recorder of claim 18 in which the DVD encoder also generates channel codes based on the error correction code, the error detection code, and the scrambled data according to DVD standard.

20. The DVD recorder of claim 18 in which the DVD recorder comprises an integrated circuit that comprises the audio/video encoder and the DVD encoder.

21. The DVD recorder of claim 18 in which the DVD encoder comprises an identification error detection encoder that generates an error detection code for an identification code associated with each sector of the multiplexed data.

22. An apparatus comprising:
a memory having a first region and a second region;
a multiplexer to store multiplexed audio data and video data in the first region of the memory; and
an encoder to read the multiplexed data from the first region of the memory, to process the multiplexed data to generate code that includes error correction information and having a format that is compatible with a recording standard for recording the code to an optical storage medium, the encoder storing the code in the second region of the memory, the encoder reading the multiplexed data from the first region and storing the code in the second region of the memory without using an integrated drive electronics (IDE) interface.

23. The apparatus of claim 22 in which the encoder comprises a data scrambler to scramble the multiplexed data to generate scrambled data.

24. The apparatus of claim 23 in which the encoder comprises an error detection code (EDC) encoder to generate error detection data based on the scrambled data to allow detection of one or more errors in the scrambled data, the EDC encoder storing the error detection data and the scrambled data in a third region of the memory.

25. The apparatus of claim 24 in which the encoder comprises an error correction code encoder to read the scrambled data and the error detection data from the third region of the memory, and process the scrambled data and the error detection data to generate the code that includes error correction information.

26. The apparatus of claim 22 in which the optical storage medium is compatible with DVD standard.

27. An apparatus comprising:
first data processing means for storing multiplexed audio data and video data in a memory device; and
second data processing means for
reading the multiplexed data from the memory device, scrambling the multiplexed data to generate scrambled data, and storing the scrambled data in the memory device,
in which the first and second data processing means access the memory device using a common memory controller.

28. The apparatus of claim 27 in which the second data processing means access the memory device not more than twice for each sector of multiplexed data that is scrambled, the first access to the memory to read a sector of the multiplexed data from the memory, and the second access to the memory to write the scrambled data to the memory device.

29. The apparatus of claim 28, further comprising a third data processing means for generating error correction codes based on the scrambled data.

30. The apparatus of claim 29, further comprising a fourth data processing means for generating channel codes based on the error correction codes and the scrambled data, the channel codes being compatible with an optical storage standard.

31. The apparatus of claim 30 in which the optical storage standard comprises DVD standard.

32. A method comprising:
storing multiplexed audio data and video data in a memory device;
scrambling the multiplexed data to generate scrambled data, the scrambled data having a bit sequence that is different from the multiplexed data; and
storing the scrambled data in the memory device, in which storing the multiplexed data to the memory and storing the scrambled data to the memory are performed using a common memory controller.

33. The method of claim 32, further comprising generating error correction data based on the scrambled data, the error correction data allowing correction of one or more errors in the scrambled data.

34. The method of claim 33, further comprising generating channel codes based on the error correction data and the scrambled data, the channel codes being compatible with an optical storage standard.

35. The method of claim 34 in which the optical storage standard comprises at least one of DVD+RW, DVD−RW, DVD+R, DVD−R, and high density DVD (HD−DVD) standard.

36. The method of claim 33 in which the error correction data are compatible with DVD standard.

37. The method of claim 32 in which the scrambled data are compatible with DVD standard.

38. The method of claim 32, further comprising processing an audio signal and a video signal according to compression processes to generate the audio data and the video data.

39. The method of claim 38 in which the compression process for processing the video signal is compatible with MPEG standard.

40. The method of claim 39 in which the MPEG standard comprises at least one of MPEG 2 and MPEG 4 standard.

41. The method of claim 32 in which scrambling the multiplexed data comprises reading the multiplexed data from the memory device, the reading performed without using an integrated device electronics (IDE) interface.

42. The method of claim 32, further comprising generating identification data for each sector of the multiplexed data.

43. The method of claim 42, further comprising generating error detection data for each sector of the multiplexed data, the error detection data allowing detection of one or more errors in the multiplexed data.

44. The method of claim 43, further comprising generating error correction data for a predetermined number of sectors of the multiplexed data and their associated identification data and error detection data, the error correction data allowing correction of one or more errors in the predetermined number of sectors of the multiplexed data and their associated identification data and error detection data.

45. The method of claim 42 in which generating the identification data and scrambling the multiplexed data are performed without storing information to the memory device.

* * * * *

UNITED STATES PATENT AND TRADEMARK OFFICE
CERTIFICATE OF CORRECTION

PATENT NO. : 7,580,211 B2
APPLICATION NO. : 10/979769
DATED : August 25, 2009
INVENTOR(S) : Chung-Hung Tsai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Fourteenth Day of September, 2010

David J. Kappos
*Director of the United States Patent and Trademark Office*